(12) United States Patent  (10) Patent No.: US 8,860,875 B2
Fujii  (45) Date of Patent: Oct. 14, 2014

(54) IMAGING DEVICE FOR RECOGNITION AND METHOD OF CONTROLLING THE SAME

(75) Inventor: Takashi Fujii, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 560 days.

(21) Appl. No.: 13/147,207

(22) PCT Filed: Nov. 26, 2010

(86) PCT No.: PCT/JP2010/006900
§ 371 (c)(1),
(2), (4) Date: Aug. 1, 2011

(87) PCT Pub. No.: WO2011/067906
PCT Pub. Date: Jun. 9, 2011

(65) Prior Publication Data
US 2011/0285897 A1  Nov. 24, 2011

(30) Foreign Application Priority Data
Dec. 1, 2009  (JP) .................. 2009-273070

(51) Int. Cl.
*H04N 5/235* (2006.01)
*H04N 5/238* (2006.01)
*H04N 5/225* (2006.01)
*H04N 5/232* (2006.01)
*G06K 9/00* (2006.01)
*G03B 15/00* (2006.01)
*G06K 9/20* (2006.01)
*G03B 7/093* (2006.01)

(52) U.S. Cl.
CPC ............. *G03B 7/093* (2013.01); *H04N 5/23212* (2013.01); *H04N 5/23219* (2013.01); *G06K 9/00255* (2013.01); *G03B 15/00* (2013.01); *G06K 9/2027* (2013.01); *H04N 5/238* (2013.01); *H04N 5/2353* (2013.01)
USPC ............. 348/362; 348/364; 348/169; 382/118

(58) Field of Classification Search
CPC  H04N 5/2351; H04N 5/2353; G06K 9/00248
USPC ........ 348/362, 364, 366, 222.1, 169; 382/118
See application file for complete search history.

(56) References Cited

U.S. PATENT DOCUMENTS 7,454,131 B2  11/2008  Suda
7,526,193 B2 * 4/2009  Minato et al. ................. 382/118
(Continued)

FOREIGN PATENT DOCUMENTS

CN  1798264  7/2006
JP  2004-320287  11/2004
(Continued)

OTHER PUBLICATIONS

International Search Report issued Dec. 28, 2010 in International (PCT) Application No. PCT/JP2010/006900.
(Continued)

*Primary Examiner* — Nhan T Tran
(74) *Attorney, Agent, or Firm* — Wenderoth, Lind & Ponack, LLP.

(57) ABSTRACT

An imaging device for recognition (100) includes an image pickup unit (101) that sequentially generates a plurality of images by shooting an object, a face recognition unit (105) that recognizes, in each of the plurality of images, an object region in which the object is located in the image, a face tracking unit (106) that tracks the object region across the plurality of images, an area calculation unit (109) that calculates an area of the object region, and an exposure control unit (102) that sets a first exposure time for the image pickup unit (101) in the case where the area is smaller than a first threshold, and sets a second exposure time longer than the first exposure time in the case where the area is equal to or larger than the first threshold.

6 Claims, 15 Drawing Sheets

(56) References Cited

U.S. PATENT DOCUMENTS

| | | |
|---|---|---|
| 2004/0207743 A1 | 10/2004 | Nozaki et al. |
| 2006/0140600 A1 | 6/2006 | Suda |
| 2008/0013851 A1* | 1/2008 | Ishiwata et al. ............... 382/255 |
| 2008/0136958 A1* | 6/2008 | Nakahara ....................... 348/345 |
| 2009/0009652 A1* | 1/2009 | Sudo et al. .................... 382/118 |
| 2009/0066815 A1* | 3/2009 | Nozaki et al. ............... 348/222.1 |
| 2009/0196461 A1* | 8/2009 | Iwamoto ....................... 382/103 |
| 2009/0207266 A1* | 8/2009 | Yoda ........................... 348/222.1 |
| 2009/0232403 A1 | 9/2009 | Waragai et al. |
| 2009/0244323 A1* | 10/2009 | Carter et al. ............. 348/231.99 |
| 2009/0316016 A1* | 12/2009 | Iwamoto .................... 348/222.1 |
| 2010/0110266 A1* | 5/2010 | Lee et al. ................. 348/333.02 |

FOREIGN PATENT DOCUMENTS

| | | |
|---|---|---|
| JP | 2006-208626 | 8/2006 |
| JP | 2006-350645 | 12/2006 |
| JP | 2007-094535 | 4/2007 |
| JP | 2008-233470 | 10/2008 |

OTHER PUBLICATIONS

Chinese Office Action with Search Report mailed Apr. 3, 2014 issued in corresponding Chinese Application No. 201080006206.5. (with English translation).

* cited by examiner

IMAGING DEVICE FOR RECOGNITION AND METHOD OF CONTROLLING THE SAME

TECHNICAL FIELD

The present invention relates to an imaging device for recognition that recognizes an object in an image, and a method of controlling the same.

BACKGROUND ART

Latest advancement in function of digital cameras is really amazing. These days, many digital cameras are capable of recognizing the face of a non-specific person, as well as the face of a specific person. Also, some digital cameras can recognize a moving face in a through-the-lens image of the camera successively from time to time, thereby tracking the face in the image to be shot. Thus, further progress in function of digital cameras is being attempted.

It is known in the field of face recognition technique that a resolution and a signal/noise (SN) ratio of the face play an important role in recognition accuracy. For example, an insufficient resolution or a poor SN ratio of the face leads to an unclear feature of the face, resulting in degraded recognition accuracy. The resolution and the SN ratio depend on a setting of the camera. In other words, adjustment parameters of the camera are key factors with respect to recognition accuracy.

Conventional face recognition techniques thus far developed include controlling an adjustment parameter of a camera so as to facilitate recognition of a face. For example, PTL 1 discloses a technique of adjusting a focusing point, exposure, lighting, and zooming of a camera on the basis of an evaluation result of quality of a shot image data. Also, PTL 2 discloses a technique of controlling an adjustment parameter of a camera on the basis of a recognition result of a face. The latter technique includes controlling the diaphragm of the camera depending on a position, size, and orientation of the face. For example, the diaphragm is opened wide for a large face, and narrowed for a small face.

CITATION LIST

Patent Literature

[PTL 1] Japanese Unexamined Patent Application Publication No. 2007-94535
[PTL 2] Japanese Unexamined Patent Application Publication No. 2008-233470
[PTL 3] Japanese Unexamined Patent Application Publication No. 2006-350645

SUMMARY OF INVENTION

Technical Problem

In the event of recognizing the face of a person with a digital camera or the like, a depth of field (in-focus range) suitable for face recognition often fluctuates with time, because the face to be recognized moves with time in an input image. Accordingly, adjusting the focusing position and the diaphragm on the basis of an immediately preceding image data according to PTL 1 often results in the face escaping out of the depth of field. Such escaping of the face from the depth of field incurs degradation of resolution, because of a focal blur. Thus, the camera can no longer recognize the face successively from time to time, thereby failing in tracking the face.

Besides, in the case where light is insufficient for recognizing the face, it is not always possible to activate the lighting function according to PTL 1. For instance, at a place where use of flash is prohibited the lighting function cannot be performed. The use of the lighting function also leads to an increase in power consumption. Also, adjusting the diaphragm according to PTL 2 may lead to degraded recognition accuracy in the case of a small face, because the diaphragm is narrowed and hence the light for the face becomes insufficient.

Accordingly, an object of the present invention is to provide an imaging device for recognition capable of recognizing an object successively and stably from time to time, and a controlling method for such a device.

Solution To Problem

In an aspect, the present invention provides an imaging device for recognition including an image pickup unit that sequentially generates a plurality of images by shooting an object, an object recognition unit that recognizes, in each of the plurality of images, an object region in which the object is located in the image, and a tracking unit that tracks the object region across the plurality of images, the imaging device for recognition comprising an area calculation unit configured to calculate an area of the object region, and an exposure control unit configured to set a first exposure time for the image pickup unit in the case where the area is smaller than a first threshold, and to set a second exposure time longer than the first exposure time in the case where the area is equal to or larger than the first threshold.

The imaging device for recognition thus configured extends the exposure time in the case where the object region has a sufficient area, thereby increasing the light amount in the object region. Extending the exposure time is prone to incur a motion blur in the object region. However, the object region having a sufficiently large area enables a resolution required for an object recognition process and an object tracking process to be secured despite the increase in motion blur, and hence the object recognition process and the object tracking process are barely affected. On the other hand, the increase in light amount results in a higher SN ratio of the object region, thereby contributing to improving the accuracy of the object recognition process and the object tracking process.

Also, by increasing the light amount in the case where the object region has a sufficient area, the imaging device for recognition can secure a light amount required for the object recognition process, despite a decrease in light amount with time.

Further, the imaging device for recognition shortens the exposure time in the case where the object region has a small area, thereby suppressing a motion blur in the object region, which contributes to improving the accuracy of the object recognition process and the object tracking process. The imaging device for recognition also eliminates the need to control a lighting condition with a flash or the like, and hence the light amount can be increased even at a place where use of the flash is prohibited, and power consumption can be reduced.

Thus, the foregoing imaging device for recognition is capable of recognizing an object successively and stably from time to time.

The imaging device for recognition may further comprise a moving speed calculation unit configured to calculate a moving speed of the object region, and the exposure control unit may further be configured to set a third exposure time in the case where the moving speed is lower than a second threshold, and to set a fourth exposure time shorter than the third exposure time in the case where the moving speed is equal to or higher than the second threshold.

The imaging device for recognition thus configured shortens the exposure time in the case where the moving speed of the object region is fast, thereby suppressing a motion blur in the object region. This leads to a higher resolution of the object region of resolution, resulting in improved accuracy of the object recognition process and the object tracking process.

The imaging device for recognition also extends the exposure time in the case where the moving speed of the object region is slow, thereby increasing the light amount in the object region. Here, the slow moving speed of the object region enables a resolution required for the object recognition process to be secured despite the increase in exposure time, and hence the object recognition process and the object tracking process are barely affected. On the other hand, the increase in light amount contributes to improving the accuracy of the object recognition process and the object tracking process.

The imaging device for recognition may further comprise a light amount calculation unit configured to calculate a light amount in the object region, and the exposure control unit may be configured to set a fifth exposure time for the image pickup unit in the case where a light amount for recognition proportional to the area and to the light amount is equal to or larger than a third threshold, and to set a sixth exposure time longer than the fifth exposure time in the case where the light amount for recognition is smaller than the third threshold.

The imaging device for recognition thus configured extends the exposure time in the case where the light amount for recognition is insufficient, thereby increasing the light amount in the object region.

Further, the imaging device for recognition shortens the exposure time in the case where the light amount for recognition is sufficient, thereby suppressing a motion blur in the object region, which contributes to improving the accuracy of the object recognition process and the object tracking process.

In the imaging device for recognition, the exposure control unit may be configured to set the first exposure time in the case where a resolution for recognition proportional to the area and inversely proportional to a motion blur in the object region is lower than a fourth threshold, and to set the second exposure time in the case where the resolution for recognition is equal to or higher than the fourth threshold.

The imaging device for recognition thus configured employs the resolution for recognition taking the motion blur into account, thereby controlling the exposure time with higher accuracy.

In another aspect, the present invention provides an imaging device for recognition including an image pickup unit that sequentially generates a plurality of images by shooting an object, an object recognition unit that recognizes, in each of the plurality of images, an object region in which the object is located in the image, and a tracking unit that tracks the object region across the plurality of images, the imaging device for recognition comprising an area calculation unit configured to calculate an area of the object region, and a focusing position control unit configured to set a first focusing position for the imaging device for recognition in the case where the area is smaller than a first threshold, and to set a second focusing position farther from the object than is the first focusing position in the case where the area is equal to or larger than the first threshold.

The imaging device for recognition thus configured sets the focusing position ahead of the object recognition distance in the case where the object region has a sufficient area, thereby extending a depth of field in which the object can be recognized. By extending thus the depth of field in the case where the object region has a sufficient area, the imaging device for recognition can secure a resolution required for the object recognition process, despite a sudden movement of the object.

The imaging device for recognition sets the focusing position close to the object recognition distance in the case where the resolution of the object region is insufficient, thereby increasing the resolution of the object region.

Thus, the foregoing imaging device for recognition adjusts the focusing position on the basis of the area of the object region, thereby recognizing the object successively and stably from time to time.

In the imaging device for recognition according to the second aspect, the focusing position control unit may be configured to set the first focusing position in the case where a resolution for recognition proportional to the area and inversely proportional to a focal blur in the object region is lower than a second threshold, and to set the second focusing position in the case where the resolution for recognition is equal to or higher than the second threshold.

The imaging device for recognition thus configured employs the resolution for recognition taking the focal blur into account, thereby controlling the focusing position with higher accuracy.

In still another aspect, the present invention provides an imaging device for recognition including an image pickup unit that sequentially generates a plurality of images by shooting an object, an object recognition unit that recognizes, in each of the plurality of images, an object region in which the object is located in the image, and a tracking unit that tracks the object region across the plurality of images, the imaging device for recognition comprising an area calculation unit configured to calculate an area of the object region, and a diaphragm control unit configured to set a first aperture value for the imaging device for recognition in the case where the area is smaller than a first threshold, and to set a second aperture value higher than the first aperture value in the case where the area is equal to or larger than the first threshold.

The imaging device for recognition thus configured increases the aperture value in the case where the object region has a sufficient area. In the case where the object region is sufficiently large, noises of the respective pixels are leveled off, and hence the impact of the noise is reduced. This leads to a relative increase in signal volume of the pixels in the object region, thereby enabling a light amount required for recognition to be secured, despite the increase in aperture value. Thus, the imaging device for recognition can extend the recognition range while securing the light amount required for recognition. Also, extending thus the depth of field enables a resolution required for the object recognition process to be secured, despite a sudden movement of the object.

Further, the imaging device for recognition reduces the aperture value in the case where the object region has a small area. The object region of a small area incurs a greater impact of the noise. However, reducing the aperture value enables a light amount required for recognition to be secured. Also, the imaging device for recognition eliminates the need to control a lighting condition with a flash or the like, and hence the light amount can be secured even at a place where use of the flash is prohibited, and power consumption can be reduced.

The imaging device for recognition may further comprise a light amount calculation unit configured to calculate a light amount in the object region, and the diaphragm control unit may further be configured to set a third aperture value in the case where the light amount is smaller than a second threshold, and to set a fourth aperture value higher than the third aperture value in the case where the light amount is equal to or larger than the second threshold.

The imaging device for recognition thus configured increases the aperture value in the case where the light amount is sufficient. A sufficient light amount leads to a larger volume of the signal of each pixel, and hence a light amount required for recognition can be secured despite the increase in aperture value. Thus, the foregoing imaging device for recognition can extend the recognition range while securing the light amount required for recognition. Also, extending the depth of field when the light amount is sufficient enables a resolution required for the object recognition process to be secured, despite a sudden movement of the object.

Further, the imaging device for recognition reduces the aperture value in the case where the light amount is insufficient, thereby securing a light amount required for recognition.

In the imaging device for recognition, the diaphragm control unit may be configured to set the first aperture value in the case where a light amount for recognition proportional to the area and to the light amount is smaller than a third threshold, and to set a sixth exposure time longer than the fifth exposure time in the case where the light amount for recognition is equal to or larger than the third threshold.

The imaging device for recognition thus configured employs the light amount for recognition taking the area into account, thereby controlling the aperture value with higher accuracy.

It is to be noted that the present invention can be realized not only as the foregoing imaging device for recognition, but also as a control method therefor including steps corresponding to the distinctive functions of the imaging device for recognition, and as a program that causes a computer to perform the distinctive functions. Naturally, such a program can be distributed by means of a non-transitory computer-readable recording medium such as a CD-ROM, or a communication medium such as the internet.

Further, the present invention can also be realized in a form of a semiconductor LSI that performs a part or whole of the functions of the imaging device for recognition, and a camera including the imaging device for recognition.

Advantageous Effects of Invention

Thus, the present invention provides an imaging device for recognition capable of recognizing an object successively and stably from time to time, and a controlling method for such a device.

DESCRIPTION OF EMBODIMENTS

Embodiment 1

Figure 1:
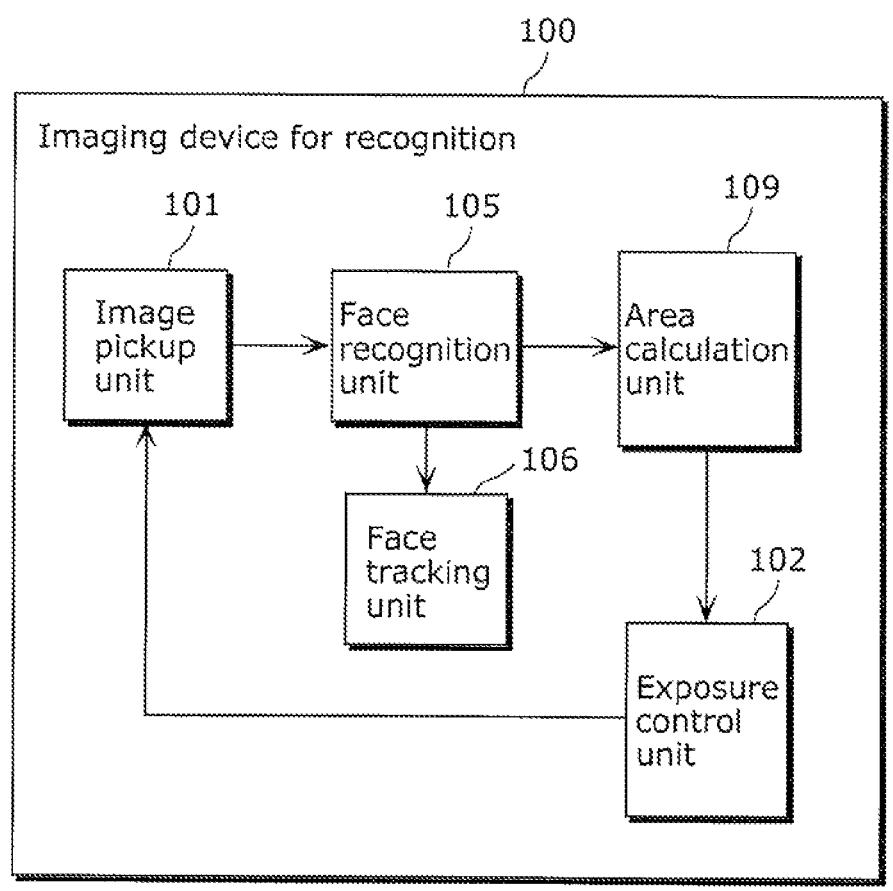
FIG. 1 is a block diagram of an imaging device for recognition according to a first embodiment of the present invention.

An imaging device for recognition according to a first embodiment of the present invention changes a shutter speed depending on an area, a moving speed and a light amount of a face region. More specifically, the imaging device for recognition according to the first embodiment reduces the shutter speed in the case where the face region has a large area.

The imaging device for recognition thus configured according to the first embodiment can stably recognize the face. Hereunder, the first embodiment of the present invention will be described referring to the drawings.

First, a structure of the imaging device for recognition 100 according to the first embodiment will be described.

FIG. 1 is a block diagram of the imaging device for recognition 100 according to the first embodiment of the present invention.

The imaging device for recognition 100 shown in FIG. 1 may be, for example, a digital still camera, a digital video camera, a network camera, or a security camera. The imaging device for recognition 100 includes an image pickup unit 101, an exposure control unit 102, a face recognition unit 105, a face tracking unit 106, and an area calculation unit 109.

The image pickup unit 101 receives a subject image taken by an imaging optical system and generates an electrical signal. In other words, the image pickup unit 101 shoots an object thereby sequentially generating a plurality of images.

The face recognition unit 105 corresponds to the object recognition unit of the present invention. The face recognition unit 105 recognizes, with respect to each of the plurality, of images generated in the image pickup unit 101, an object region which is a region in the image where the object is located.

The face tracking unit 106 corresponds to the tracking unit of the present invention. The face tracking unit 106 tracks the object region across the plurality of images generated in the image pickup unit 101.

The area calculation unit 109 calculates an area of the object region.

The exposure control unit 102 sets a first exposure time in the image pickup unit 101 in the case where the area of the object region is smaller than an area threshold (first threshold), and sets a second exposure time, which is longer than the first exposure time, in the case where the area of the object region is equal to or larger than the area threshold.

Figure 2:
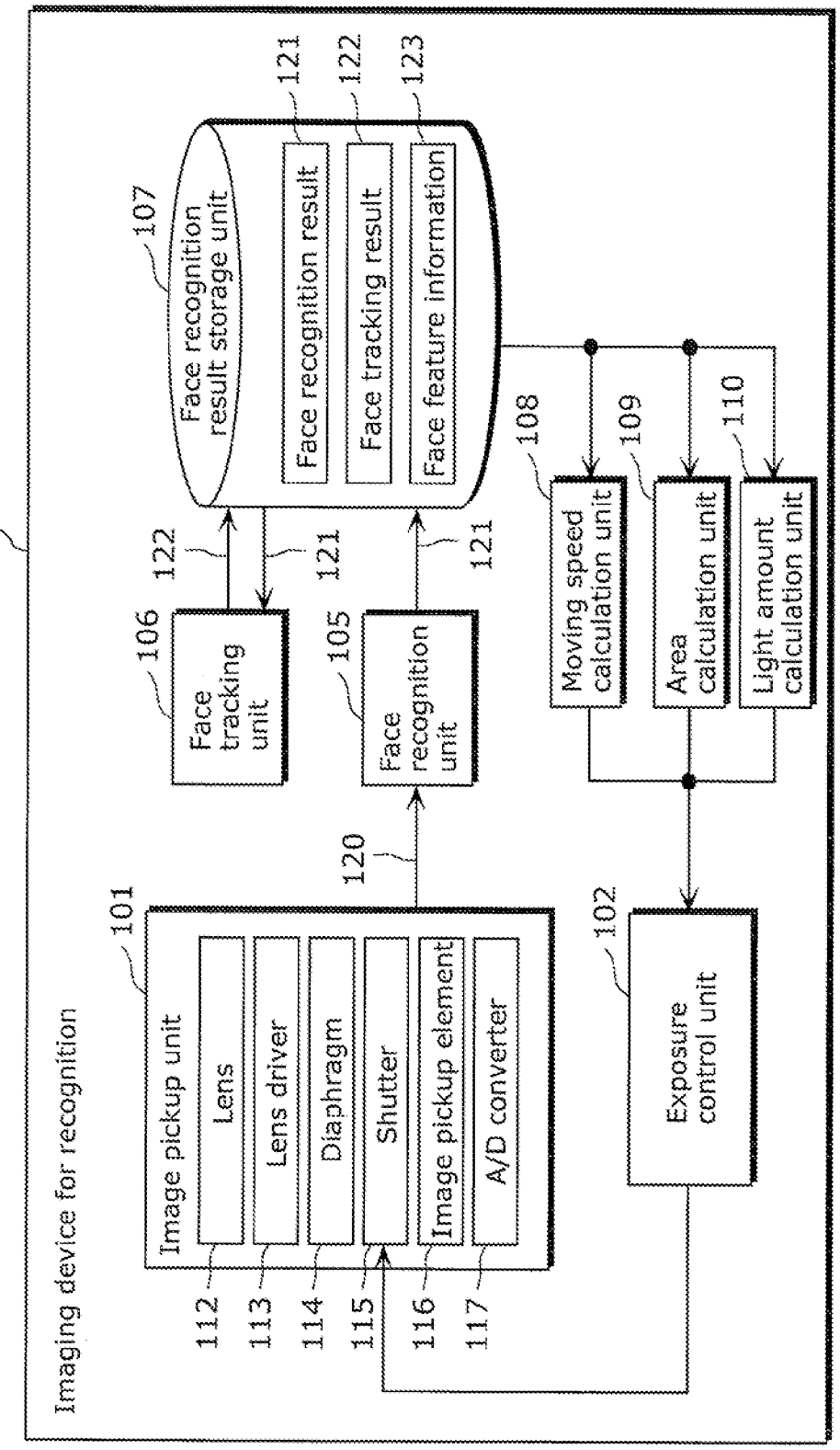
FIG. 2 is a detailed block diagram of the imaging device for recognition according to the first embodiment of the present invention.

FIG. 2 is a detailed block diagram of the imaging device for recognition 100. As shown therein, the imaging device for recognition 100 further includes a face recognition result storage unit 107, a moving speed calculation unit 108, and a light amount calculation unit 110.

The image pickup unit 101 includes a lens 112, a lens driving unit 113 that adjusts a focusing position of the lens 112, a diaphragm 114 that adjusts an amount of light passing through the lens 112, a shutter 115 that adjusts the exposure time of the image pickup element 116, an image pickup element 116 that converts an image formed by the lens 112 into an electrical signal, and an AD converter 117 that converts the electrical signal (analog signal) generated by the image pickup element 116 into a digital signal. Also, the imaging device for recognition 100 performs signal processings such as gain correction, gamma correction, color conversion, scaling, and so forth, with respect to the digital signal generated by the AD converter 117, thereby forming an input image 120 for a face recognition unit 105 to be subsequently described, for each frame.

The exposure control unit 102 controls a shutter speed of the shutter 115 in the image pickup unit 101. A slower shutter speed extends the exposure time during which a light is incident upon the image pickup element 116. Accordingly, a larger amount of electrical signals of a subject can be gained and hence the light amount of the input image is increased. In contrast, a faster shutter speed shortens the exposure time during which a light is incident upon the image pickup element 116. Accordingly, the amount of the electrical signals of the subject is reduced and hence the light amount of the input image is decreased.

The face recognition unit 105 recognizes a face region on the input image 120, utilizing the input image 120 generated by the image pickup unit 101. The face recognition unit 105 generates a face recognition result 121 and stores that result in the face recognition result storage unit 107 with respect to every frame. The face region of a non-specific person, and that of a specific person are generally assumed to be typical objects of recognition. In the case of face region recognition for a non-specific person, an image region containing general features of a face is to be recognized. Regarding detailed recognition algorithm, for example AdaBoost algorithm disclosed in PTL 3 may be employed, so as to set up a recognizer that exclusively detects a specific orientation of a face. Naturally, the recognition method of the face region of a non-specific person is not limited to such an algorithm. In the case of face region recognition for a specific person, consistency between detailed face feature information regarding the face region of a non-specific person and face feature information 123 of a specific person registered in the face recognition result storage unit 107 is evaluated, to thereby identify an individual.

To perform the face recognition, in general, an image for recognition formed by resizing the input image 120 into a predetermined size is utilized. For example, to recognize the face region of a non-specific person, the image for recognition formed by scaling down the input image is utilized as disclosed in PTL 2. Also, according to PTL 1 the face region recognition for a specific person is performed utilizing an image for recognition formed by detecting the eyes, with respect to a recognized face region of a non-specific person, and resizing such that an interval between the eyes becomes a predetermined value. Thus, more detailed feature information is generally utilized for the face region recognition of a specific person than in the case of a non-specific person, and therefore a higher resolution is required for the face region recognition of a specific person.

Figure 3:
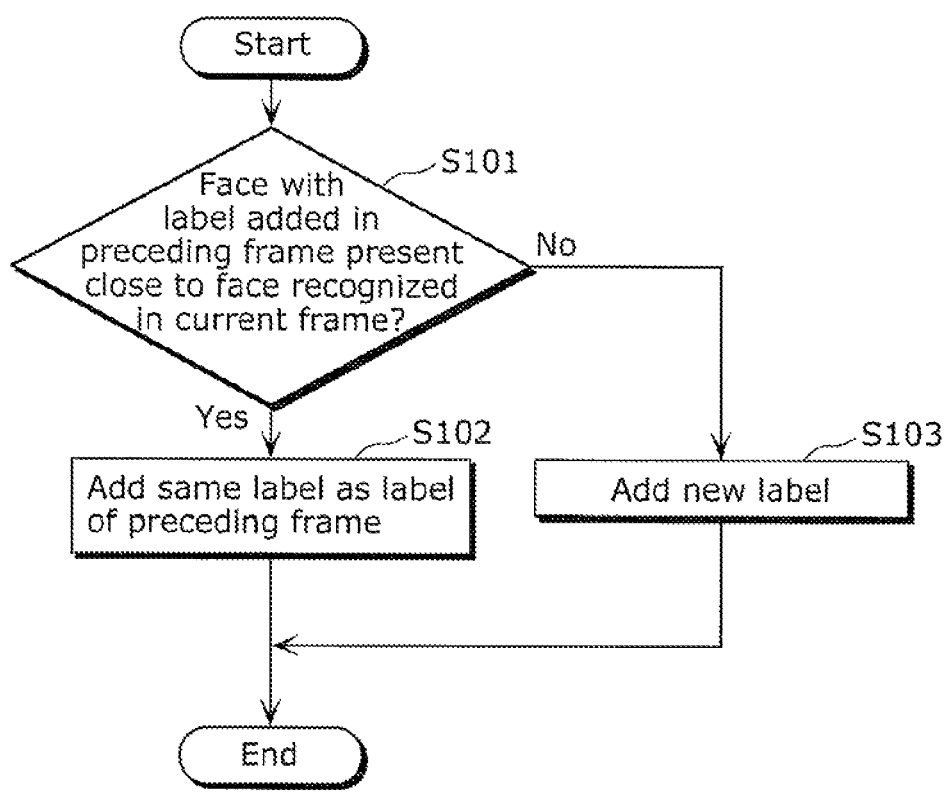
FIG. 3 is a flowchart showing a face tracking process according to the first embodiment of the present invention.

The face tracking unit 106 tracks a face across the successive input images 120 (frames) on the basis of the preceding face recognition result 121 stored in the face recognition result storage unit 107. For example, the face recognition result 121 utilized for the face tracking includes a central coordinate of the face region on the input image 120. A face once recognized is recognized, in the next frame, at a position close to where the face was recognized in the preceding frame. Accordingly, the face tracking unit 106 utilizes the continuity of the recognition position to thereby perform a face tracking process. FIG. 3 is a flowchart showing the face tracking process performed by the face tracking unit 106.

In the face tracking process shown in FIG. 3, the face tracking unit 106 first decides whether a face region with a label added thereto was present in the immediately preceding frame, at a position close to a central coordinate of the face region recognized in the current frame (S101).

In the case where the face region with a label is decided to have been present in the preceding frame (Yes at S101), the face tracking unit 106 adds the same label as that added to the face region of the preceding frame, to the face region recognized in the current frame (S102).

In the case where the face region with a label has not been found in the preceding frame (No at S101), the face tracking unit 106 adds an exclusive label different from those for previously recognized faces to the face region recognized in the current frame (S103).

Although the foregoing description refers to the tracking method based on the positional continuity, a tracking method utilizing a color may be adopted. In the case where a plurality of face is to be tracked, the face tracking unit 106 selects a label of a face about which an adjustment parameter of the camera is to be controlled. In the case where a specific person registered in the face recognition unit 105 is recognized, the label of that face is selected. Alternatively, the face to be controlled may be selected on the basis of a size and position of the recognized face, as disclosed in PTL 2. Also, the face tracking unit 106 stores the generated face tracking result 122 in the face recognition result storage unit 107, with respect to every frame.

The face recognition result storage unit 107 retains, with respect to every frame, the face recognition result 121 generated by the face recognition unit 105 and the face tracking result 122 generated by the face tracking unit 106. The face recognition result 121 includes, for example, the coordinate of the face region on the input image, the number of horizontal and vertical pixels of the face region, and the recognition status of the registered specific person. The face tracking result 122 includes, for example, a label for distinction of the face region and a label for controlling the camera. The face recognition result storage unit 107 also retains the face feature information 123, which contains the details of the face of a specific person, to be utilized by the face recognition unit 105 for recognition of the specific person. Here, the imaging device for recognition 100 deletes oldest data in the even that the data of each frame has been accumulated in the face recognition result storage unit 107 until its capacity is saturated, to thereby constantly look up a latest history.

The moving speed calculation unit 108 calculates a moving speed of the face with the label for controlling the camera, on the basis of the face recognition result 121 and the face tracking result 122 stored in the face recognition result storage unit 107. More specifically, the moving speed calculation unit 108 calculates the number of pixels between the central coordinate of the face region in the immediately preceding frame and the central coordinate of the face region of the current frame, with respect to the face having the same label in the preceding frame and the current frame. Then the moving speed calculation unit 108 calculates the moving speed in a two-dimensional direction on the basis of the number of pixels thus calculated. The moving speed calculation unit 108 also calculates a difference in number of horizontal and vertical pixels between the face region in the preceding frame and the face region of the current frame, with respect to the face having the same label in the preceding frame and the current frame. Then the moving speed calculation unit 108 calculates the moving speed in a depthwise direction on the basis of the difference thus calculated. However, the calculation method of the moving speed is not limited to the foregoing.

The area calculation unit 109 calculates an area of the face region of the face with the label for controlling the camera, on the basis of the face recognition result 121 and the face tracking result 122 stored in the face recognition result storage unit 107. To calculate the area, the resolution of the face in the image for recognition (hereinafter, resolution for recognition), or the number of pixels of the face in the input image 120 may be utilized. Here, the resolution for recognition refers to a density of pixels of the image, and the higher the resolution is the more clearly the face feature appears. For example, the resolution for recognition is proportional to the area (number of pixels) of the face region, and inversely proportional to an amount of motion blur (or focal blur) in the face region. Specifically, an AF evaluation value (based on a contrast amount) of the image region for recognition may be employed as the resolution for recognition. Alternatively, a value obtained by normalizing the AF evaluation value of the face region on the input image 120 with the area of the image for recognition may be employed as the resolution for recognition. However, the calculation method of the area of the race region is not limited to the foregoing.

The light amount calculation unit 110 calculates a light amount in the face region with the label for controlling the camera, on the basis of the face recognition result 121 and the face tracking result 122 stored in the face recognition result storage unit 107. More specifically, the light amount calculation unit 110 calculates a mean value of luminosity of the plurality of pixels in the face region of the image for recognition, or a mean value of the plurality of pixels in the face region on the input image 120, and calculates the light amount on the basis of the obtained mean value. Also, in the case where the input image 120 is subjected to a luminosity correction such as gain correction or gamma correction, the light amount calculation unit 110 performs the reverse correction on the input image 120, and calculates the light amount with respect to the image subjected to the reverse correction. However, the calculation method of the light amount in the race region is not limited to the foregoing.

The exposure control unit 102 determines a shutter speed on the basis of the area, the moving speed, and the light amount calculated by the moving speed calculation unit 108, the area calculation unit 109, and the light amount calculation unit 110, respectively.

The following passages describe a calculation method employed by the exposure control unit 102 for calculating the shutter speed on the basis of the information generated by the moving speed calculation unit 108, the area calculation unit 109, and the light amount calculation unit 110. It will be assumed here that the face being tracked (with a face history in the preceding frame), about which the camera is to be controlled, is to be processed.

Figure 4:
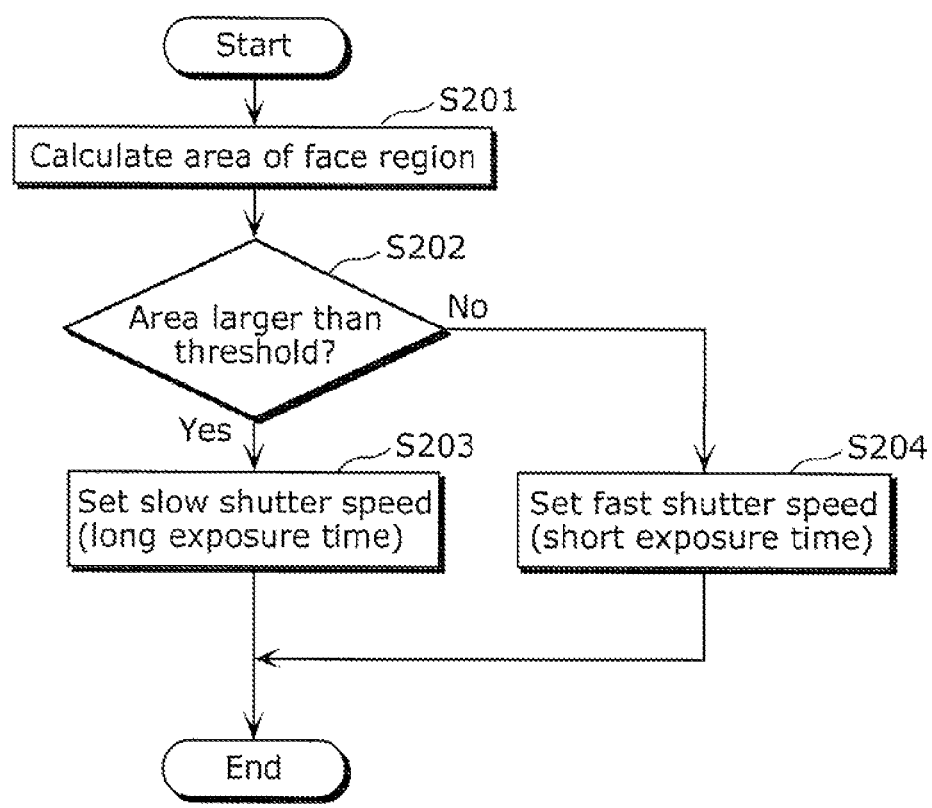
FIG. 4 is a flowchart showing a shutter speed control process based on an area of a face region, performed by the imaging device for recognition according to the first embodiment of the present invention.

First, a controlling process of the shutter speed based on the area of the face region, performed by the exposure control unit 102, will be described. FIG. 4 is a flowchart showing the shutter speed control process based on the area of the face region.

For example, the series of steps shown in FIGS. 4 to 7 are performed with respect to every frame. However, the series of steps shown in FIGS. 4 to 7 may be performed with respect to a predetermined plurality of frames.

First, the area calculation unit 109 calculates the area of the face region to be processed. It will be assumed that the AF evaluation value of the image for recognition is utilized as the area (S201).

Then the exposure control unit 102 decides whether the area of the face region is equal to or larger than the area threshold (area sufficient for recognition) (S202). The area threshold varies depending on the recognition method. For example, the area threshold for the face recognition of a specific person is higher than that for the face recognition of a non-specific person.

In the case where the area of the face region is equal to or larger than the area threshold (Yes at S202), the exposure control unit 102 sets a slower shutter speed of the image pickup unit 101 than a current shutter speed (S203). In other words, the exposure control unit 102 sets a longer exposure time than a current exposure time, for the image pickup unit 101. Here, the exposure control unit 102 calculates an upper limit of the shutter speed that keeps the resolution for recognition equal to or above a resolution threshold, on the basis of a relationship between the current area of the face region and the current shutter speed. Then the exposure control unit 102 sets the shutter speed at a value not exceeding the upper limit thus calculated.

In the case where the face region has a sufficient area, the exposure control unit 102 thus extends the exposure time of the image pickup unit 101, thereby increasing the light amount in the face region. Now, extending the exposure time is prone to incur a motion blur in the face region. However, the face region having a sufficiently large area enables the resolution required for the face recognition process to be secured despite the increase in motion blur, and hence the face recognition process and the face tracking process are barely affected. On the other hand, the increase in light amount results in a higher SN ratio of the face region, thereby contributing to improving the accuracy of the face recognition process and the face tracking process.

In the case where the face region has a sufficient area, also, increasing the light amount enables a light amount required for the face recognition process to be secured, despite a decrease in light amount with time.

On the contrary, in the case where the area of the face region is below the area threshold (No at S202), the exposure control unit 102 sets a faster shutter speed of the image pickup unit 101 than the current shutter speed (S204). In other words, the exposure control unit 102 sets a shorter exposure time than the current exposure time, for the image pickup unit 101.

Thus, the exposure control unit 102 shortens the exposure time of the image pickup unit 101 in the case where the face region has a small area, thereby suppressing a motion blur in the face region, which contributes to improving the accuracy of the face recognition process and the face tracking process.

Here, the exposure control unit 102 may increase or decrease the shutter speed by a predetermined fixed amount at the steps S203 and S204, or adjust the amount of change in shutter speed in accordance with the area of the face region. For example, the exposure control unit 102 may set the slower shutter speed the larger the area of the face region is, at the step S203. Likewise, the exposure control unit 102 may set the faster shutter speed the smaller the area of the face region is, at the step S204.

Alternatively, the exposure control unit 102 may be configured to set, at the step S204, a shutter speed that is at least faster than the shutter speed to be set at the step S203. In other words, the exposure control unit 102 may be configured to set at the step S204 an exposure time of the image pickup unit 101 that is at least shorter than the exposure time to be set at the step S203.

Although the foregoing process employs a single threshold to adjust the shutter speed, a plurality of thresholds may be employed. For example, the exposure control unit 102 may reduce the shutter speed when the area of the face region is equal to or larger than a first area threshold; increase the shutter speed when the area of the face region is smaller than a second area threshold lower than the first area threshold; and keep the current shutter speed when the area of the face region is between the first area threshold and the second area threshold. Also, the exposure control unit 102 may adjust the amount of change in shutter speed in accordance with the relationship between the area of the face region and the plurality of area thresholds.

Figure 5:
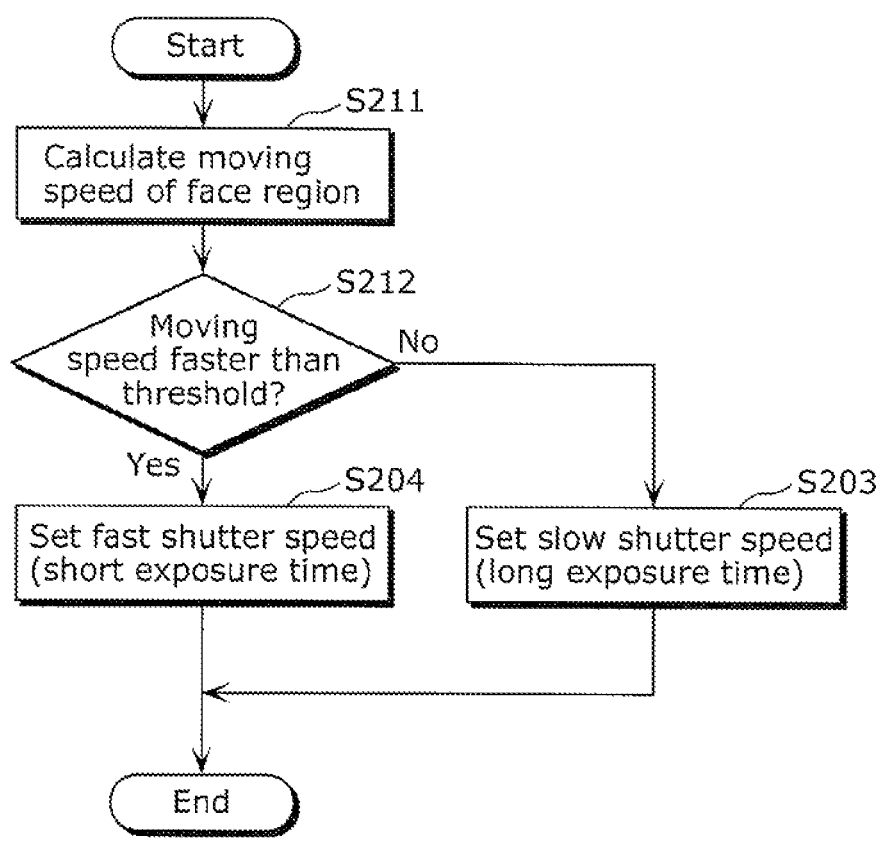
FIG. 5 is a flowchart showing a shutter speed control process based on a moving speed of the face region, performed by the imaging device for recognition according to the first embodiment of the present invention.

Hereunder, a control process of the shutter speed based on a moving speed of the face region, performed by the exposure control unit 102, will be described. FIG. 5 is a flowchart showing the control process of the shutter speed based on the moving speed of the face region. In the subsequent passages, the same process will be given the same numeral, and the description thereof may be skipped.

First, the moving speed calculation unit 108 calculates the moving speed in a two-dimensional direction of the face region to be processed (S211).

Then the exposure control unit 102 decides whether the moving speed is equal to or faster than a speed threshold of the face region (S212).

In the case where the moving speed of the face region is slower than the speed threshold (No at S212), the exposure control unit 102 sets a faster shutter speed of the image pickup unit 101 than a current shutter speed (S203).

As a result, the light amount in the face region can be increased. Here, the slow moving speed enables a resolution required for the face recognition process to be secured despite the increase in exposure time, and hence the face recognition process and the face tracking process are barely affected. On the other hand, the increase in light amount contributes to improving the accuracy of the face recognition process and the face tracking process.

On the contrary, in the case where the moving speed of the face region is equal to or faster than the speed threshold (Yes at S212), the exposure control unit 102 sets a faster shutter speed of the image pickup unit 101 than the current shutter speed (S204).

Thus, the exposure control unit 102 shortens the exposure time of the image pickup unit 101 in the case where the moving speed of the face region is high. Increasing the shutter speed suppresses a motion blur in the face region, thereby increasing the resolution thereof. Resultantly, the accuracy of the face recognition process and the face tracking process can be improved.

Here, the exposure control unit 102 may increase or decrease the shutter speed by a predetermined fixed amount at the steps S203 and S204, or adjust the amount of change in shutter speed in accordance with the moving speed of the face region. For example, the exposure control unit 102 may set the slower shutter speed the slower the moving speed of the face region is, at the step S203. Likewise, the exposure control unit 102 may set the faster shutter speed the faster the moving speed of the face region is, at the step S204.

Alternatively, the exposure control unit 102 may be configured to set, at the step S204, a shutter speed that is at least faster than the shutter speed to be set at the step S203. In other words, the exposure control unit 102 may be configured to set at the step S204 an exposure time of the image pickup unit 101 that is at least shorter than the exposure time to be set at the step S203.

Although the foregoing process employs a single threshold to adjust the shutter speed, a plurality of thresholds may be employed. For example, the exposure control unit 102 may reduce the shutter speed when the moving speed of the face region is equal to or faster than a first speed threshold; increase the shutter speed when the moving speed of the face region is slower than a second speed threshold lower than the first speed threshold; and keep the current shutter speed when the moving speed of the face region is between the first speed threshold and the second speed threshold. Also, the exposure control unit 102 may adjust the amount of change in shutter speed in accordance with the relationship between the moving speed of the face region and the plurality of speed thresholds.

Figure 6:
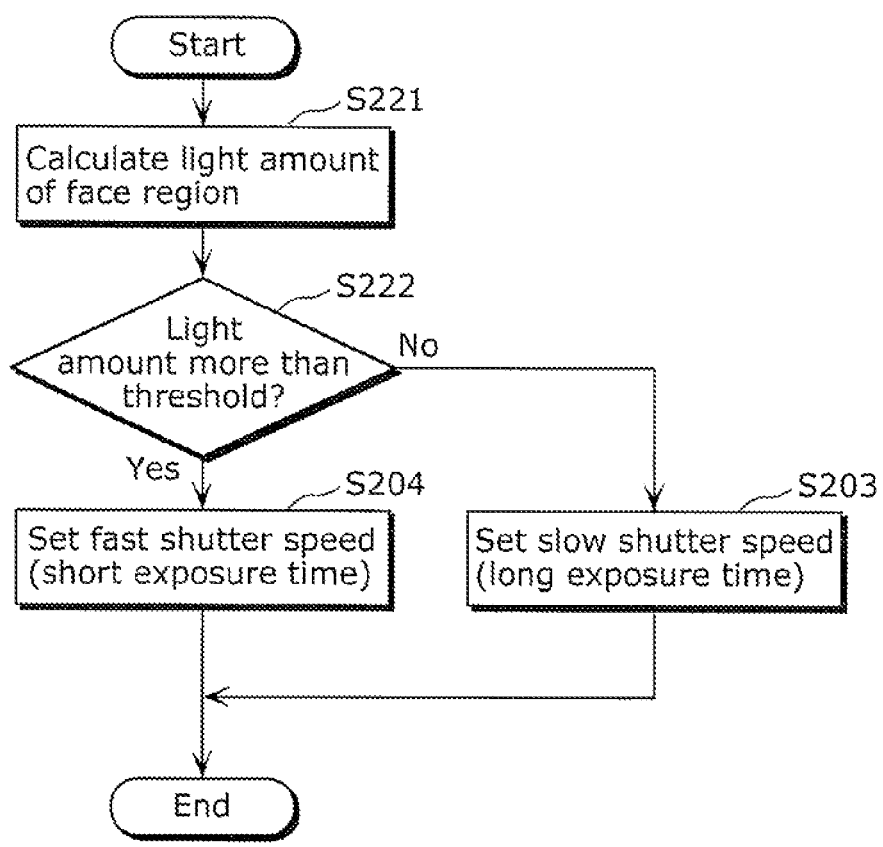
FIG. 6 is a flowchart showing a shutter speed control process based on a light amount of the face region, performed by the imaging device for recognition according to the first embodiment of the present invention.

Hereunder, a control process of the shutter speed based on a light amount of the face region, performed by the exposure control unit 102, will be described. FIG. 6 is a flowchart showing the control process of the shutter speed based on the light amount of the face region.

First, the light amount calculation unit 110 calculates a light amount in the face region to be processed (S221). Here, a mean value of luminosity of a plurality of pixels in the face region of the image for recognition will be employed as the light amount.

Then the exposure control unit 102 decides whether the light amount of the face region is equal to or larger than light amount threshold (light amount sufficient for recognition) (S222). Here, the light amount threshold varies depending on the recognition method. For example, the light amount threshold for the face recognition of a specific person is higher than that for the face recognition of a non-specific person. Also, for this decision the exposure control unit 102 may employ the light amount calculated by the light amount calculation unit 110 as it is, or may calculate a light amount for recognition proportional to the area calculated by the area calculation unit 109 and also to the light amount calculated by the light amount calculation unit 110, for comparison with the light amount threshold.

In the case where the light amount in the face region is smaller than the light amount threshold (No at S222), the exposure control unit 102 sets a slower shutter speed of the image pickup unit 101 than a current shutter speed (S203).

Thus, the exposure control unit 102 extends the exposure time of the image pickup unit 101 in the case where the light amount in the face region is smaller than the light amount threshold, thereby increasing the light amount. This leads to a higher SN ratio of the face region, thereby contributing to improving the accuracy of the face recognition process and the face tracking process.

On the contrary, in the case where the light amount in the face region is equal to or larger than the light amount threshold (Yes at S222), the exposure control unit 102 sets a faster shutter speed of the image pickup unit 101 than the current shutter speed (S204). Here, the exposure control unit 102 calculates a lower limit of the shutter speed that keeps the light amount equal to or above the light amount threshold, on the basis of a relationship between the current light amount in the face region and the current shutter speed. Then the exposure control unit 102 sets the shutter speed at a value not lower than the lower limit thus calculated.

Thus, the exposure control unit 102 shortens the exposure time of the image pickup unit 101 in the case where the light amount in the face region is sufficient, thereby suppressing a motion blur in the face region while securing a necessary light amount for the face recognition process.

Also, by increasing the shutter speed in the case where the light amount in the face region is sufficient, the imaging device for recognition can secure a resolution required for the object recognition process, despite a sudden movement of the object, because a motion blur can be suppressed.

Here, the exposure control unit 102 may increase or decrease the shutter speed by a predetermined fixed amount at the steps S203 and S204, or adjust the amount of change in shutter speed in accordance with the light amount in the face region. For example, the exposure control unit 102 may set the slower shutter speed the smaller the light amount in the face region is, at the step S203. Likewise, the exposure control unit 102 may set the faster shutter speed the larger the light amount in the face region is, at the step S204.

Alternatively, the exposure control unit 102 may be configured to set, at the step S204, a shutter speed that is at least faster than the shutter speed to be set at the step S203. In other words, the exposure control unit 102 may be configured to set at the step S204 an exposure time of the image pickup unit 101 that is at least shorter than the exposure time to be set at the step S203.

Although the foregoing process employs a single threshold to adjust the shutter speed, a plurality of thresholds may be employed. For example, the exposure control unit 102 may increase the shutter speed when the light amount in the face region is equal to or larger than a first light amount threshold; reduce the shutter speed when the light amount in the face region is smaller than a second light amount threshold lower than the first light amount threshold; and keep the current shutter speed when the light amount in the face region is between the first light amount threshold and the second light amount threshold. Also, the exposure control unit 102 may adjust the amount of change in shutter speed in accordance with the relationship between the light amount in the face region and the plurality of light amount thresholds.

Further, although the foregoing process separately employs each of the area, moving speed, and light amount of the face region, these factors may be combined. In other words, the exposure control unit 102 may adjust the shutter speed on the basis of at least one of the area, moving speed, and light amount of the face region.

Figure 7:
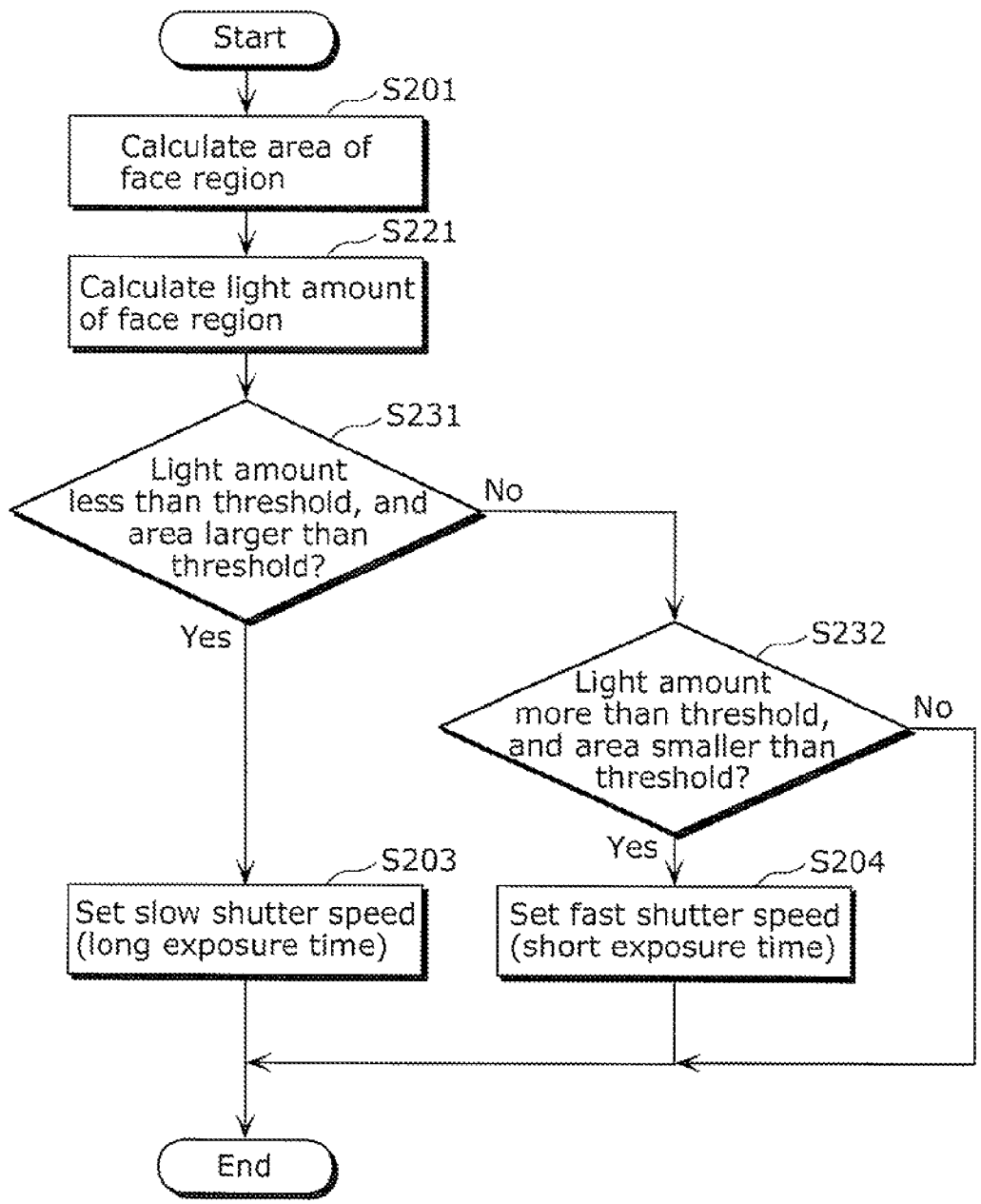
FIG. 7 is a flowchart showing a shutter speed control process based on an area and light amount of the face region, performed by the imaging device for recognition according to the first embodiment of the present invention.

FIG. 7 is a flowchart showing a variation of the shutter speed control process to be performed by the exposure control unit 102.

As shown in FIG. 7, the exposure control unit 102 may set a slower shutter speed of the image pickup unit 101 than a current shutter speed, in the case where the light amount in the face region is smaller than the light amount threshold and the area of the face region is equal to or larger than the area threshold (Yes at S231) (S203).

On the other hand, the exposure control unit 102 may set a faster shutter speed of the image pickup unit 101 than the current shutter speed, in the case where the light amount in the face region is equal to or larger than the light amount threshold and the area of the face region is smaller than the area threshold (Yes at S232) (S204).

In other cases (No at S231 and No at S232), the exposure control unit 102 maintains the current shutter speed.

At the step S203 and S204 in FIGS. 4 to 7, the exposure control unit 102 may adjust the shutter speed on the basis of at least one of the area, moving speed, and light amount of the face region. Also, the same methods as above may be adopted of the adjustment.

Thus, the imaging device for recognition 100 according to the first embodiment of the present invention can improve the resolution and SN ratio of the face region required for the face recognition process, by adjusting the shutter speed on the basis of the area, moving speed, and light amount of the face region. Consequently, the imaging device for recognition 100 is capable of recognizing an object successively and stably from time to time.

Here, although the foregoing embodiment represents the case where the exposure control unit 102 changes the shutter speed for adjusting the exposure time, different methods may be adopted for adjusting the exposure time.

Embodiment 2

An imaging device for recognition according to a second embodiment of the present invention changes a focusing position thereof, on the basis of the area of the face region. More specifically, the imaging device for recognition according to the second embodiment sets the focusing position at a position farther from the face, in the case where the face region has a large area.

Through such a process, the imaging device for recognition according to the second embodiment can stably perform the face recognition.

In the following passages, differences from the first embodiment will be primarily described, and the description already made above will not be repeated. Also, the same constituents will be given the same numeral.

Figure 8:
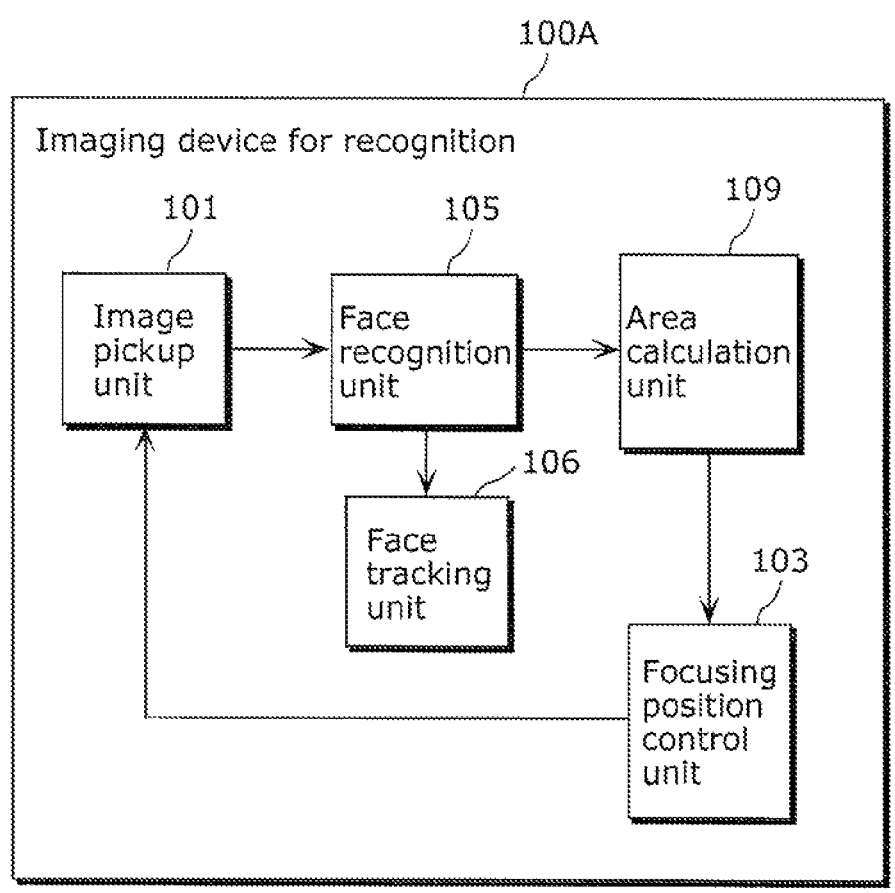
FIG. 8 is a block diagram of an imaging device for recognition according to a second embodiment of the present invention.

FIG. 8 is a block diagram of the imaging device for recognition 100A according to the second embodiment of the present invention.

The imaging device for recognition 100A shown in FIG. 8 is different from the imaging device for recognition 100 of the first embodiment in including a focusing position control unit 103 in place of the exposure control unit 102.

Figure 9:
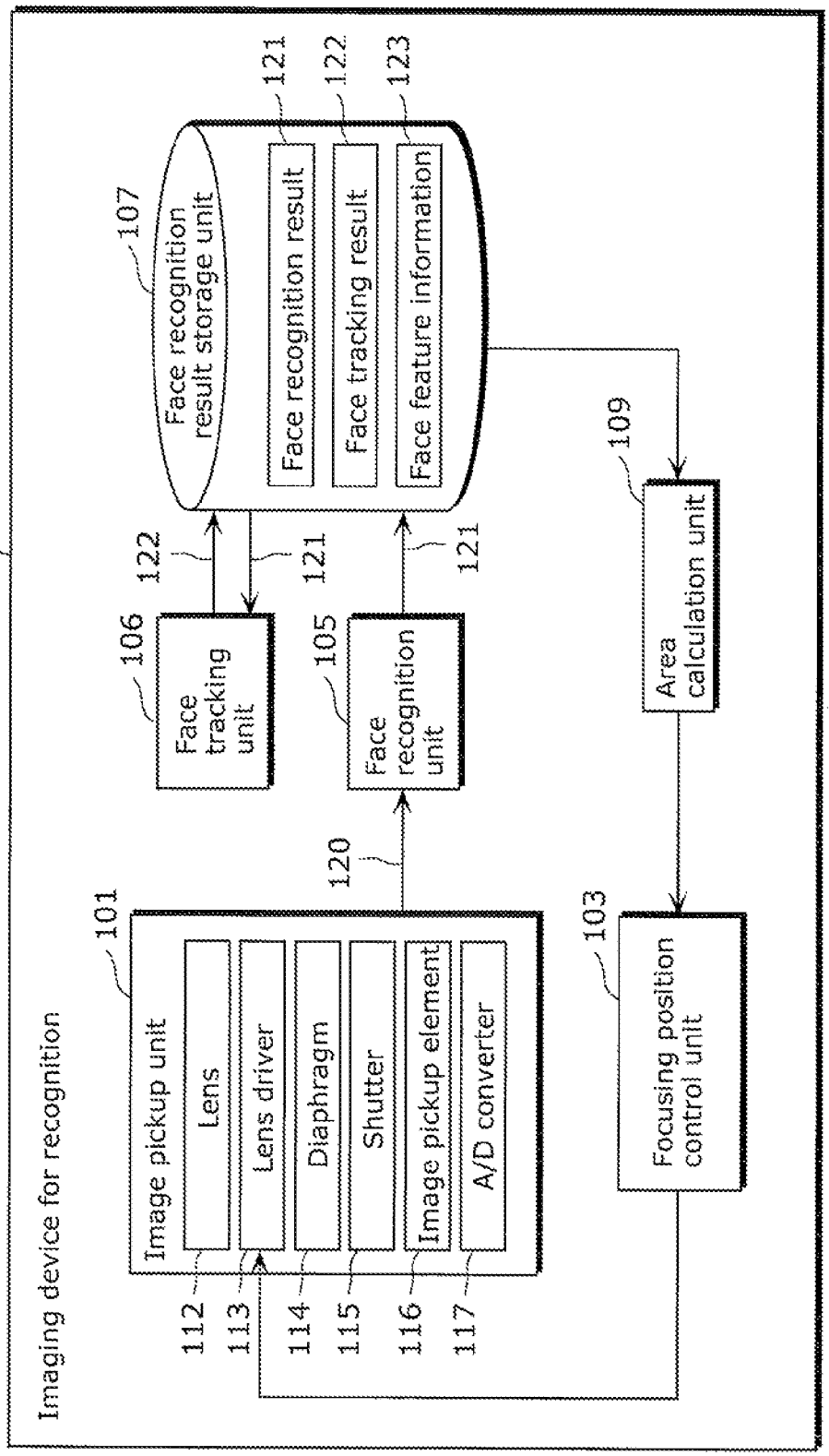
FIG. 9 is a detailed block diagram of the imaging device for recognition according to the second embodiment of the present invention.

FIG. 9 is a block diagram showing a detailed configuration of the imaging device for recognition 100A.

The focusing position control unit 103 controls the focusing position by means of the lens driving unit 113 of the image pickup unit 101. When the focusing position is close to an object, the object is in focus and hence the resolution of the object in the input image becomes higher. On the contrary, when the focusing position is far from the object, the abject is out of focus and hence the resolution of the object in the input image becomes lower.

More specifically, the focusing position control unit 103 sets the focusing position at a first position in the case where the area of the face region is smaller than the area threshold, and at a second position, farther from the object than is the first position, in the case where the area of the face region is equal to or larger than the area threshold.

Figure 10:
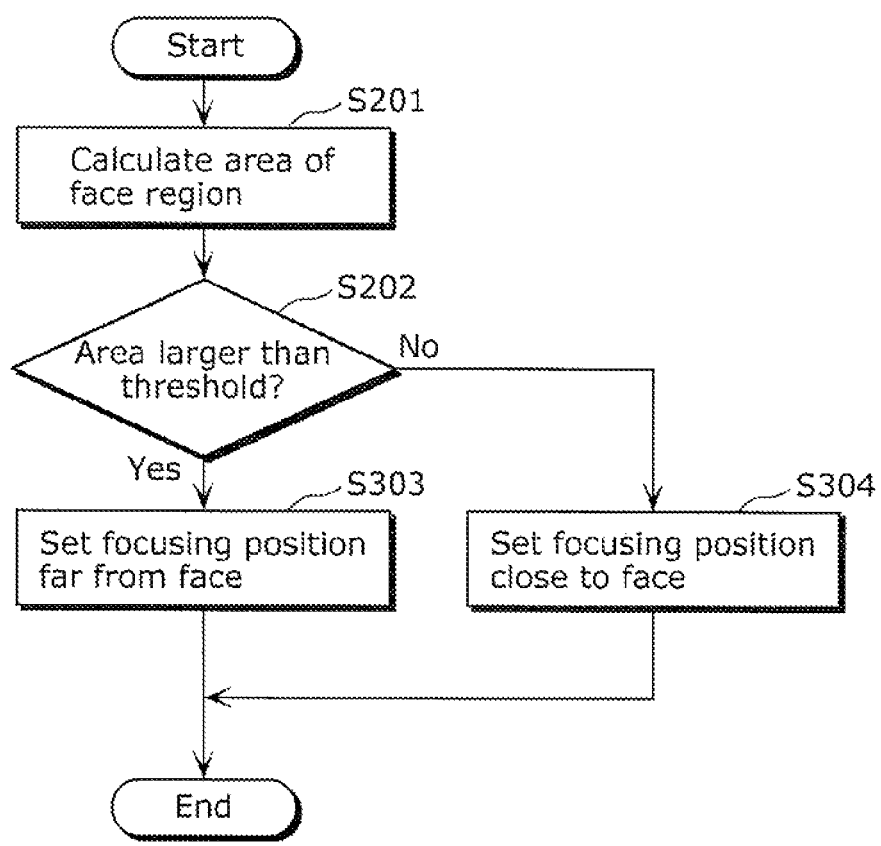
FIG. 10 is a flowchart showing a focusing position control process, performed by the imaging device for recognition according to the second embodiment of the present invention.

FIG. 10 is a flowchart showing a focusing position control process performed by the imaging device for recognition 100A. Also, it will be assumed here that the face to be processed is the face about which the camera is to be controlled.

The series of steps shown in FIG. 10 are performed with respect to every frame. However, the series of steps shown in FIG. 10 may be performed with respect to a predetermined plurality of frames.

As shown in FIG. 10, the area calculation unit 109 first calculates the area of the face region to be processed (S201). It will be assumed that the AF evaluation value of the image for recognition is utilized as the area.

Then the focusing position control unit 103 decides whether the area of the face region is equal to or larger than the area threshold (S202).

In the case where the area of the face region is equal to or larger than the area threshold (Yes at S202), the focusing position control unit 103 sets a focusing position farther from the face than is a current focusing position (S303).

On the contrary, in the case where the area of the face region has been decided to be below the area threshold (No at S202), the focusing position control unit 103 sets a focusing position closer to the face than is the current focusing position (S304).

The focusing position control unit 103 may be configured to set, at the step S304, a focusing position that is at least closer to the face than is the focusing position to be set at the step S303.

Although the foregoing process employs a single threshold to adjust the focusing position, a plurality of thresholds may be employed. For example, the focusing position control unit 103 may set the focusing position farther from the face when the area of the face region is equal to or larger than a first area threshold; set the focusing position closer to the face when the area of the face region is smaller than a second area threshold lower than the first area threshold; and keep the current focusing position when the area of the face region is between the first area threshold and the second area threshold. Also, the focusing position control unit 103 may adjust the amount of change in focusing position in accordance with the relationship between the area of the face region and the plurality of area thresholds.

Figure 11:
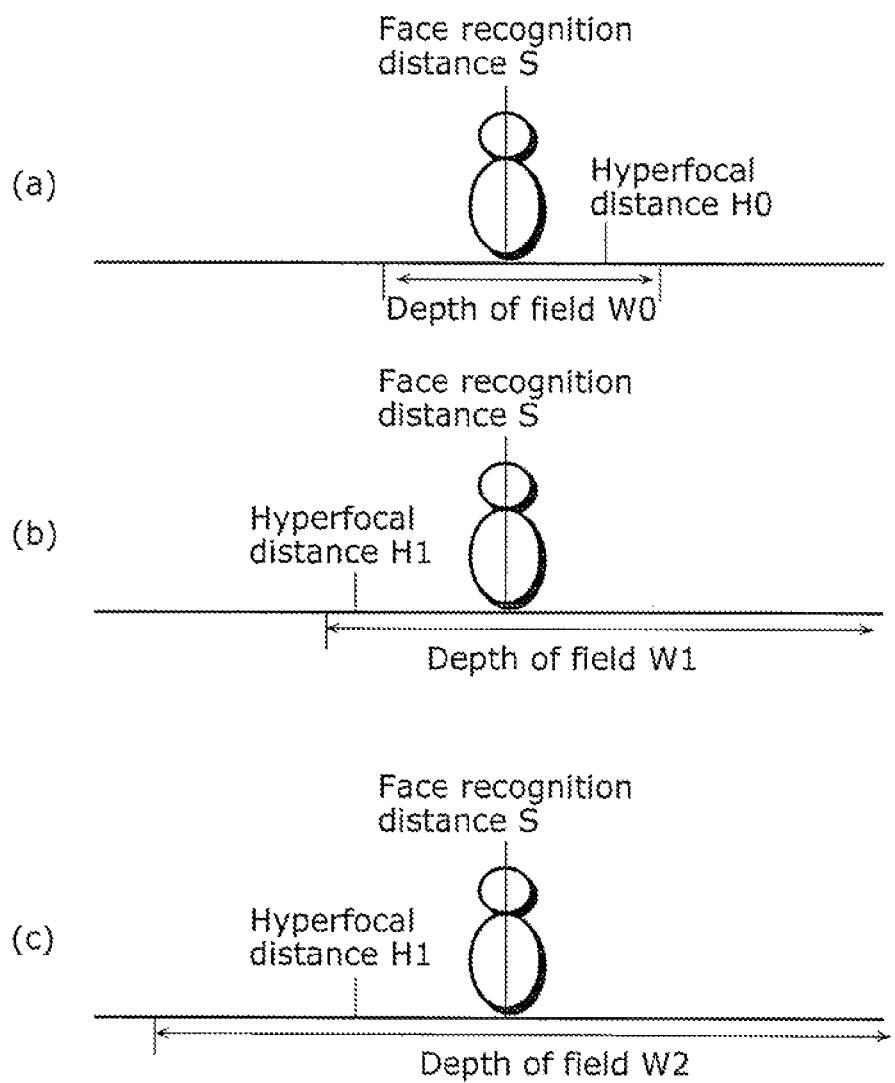
FIGS. 11(a) to 11(c) are diagrams showing a relationship between a hyperfocal distance and a depth of field according to the second embodiment of the present invention.

Referring now to FIGS. 11(*a*) to 11(*c*), a calculation method of the focusing position performed at the steps S303 and S304 will be described in details. First, a general control process of the focusing position, performed irrespective of the area of the face region, will be described referring to FIG. 11(*a*).

To start with, the concept of depth of field will be described in details. Normally the depth of field is defined by the equations (1), (2), and (3) cited below. DN represents a front edge of the depth of field, and DF represents a rear edge of the depth of field. The overall depth of field is the range delimited by DF and DN. Also, s represents the focusing position; H represents a hyperfocal distance (such a focusing position that can include infinity right at the rear edge of the depth of field); N represents an aperture value; c represents a diameter of a permissible circle of confusion (diameter of a permissible focal blur); and f represents a focal distance of the lens.

[Math. 1]

$$H = f^2/(c \times N) \quad (1)$$

$$D_N = \{s \times (H-f)\}/(H+s-2f) \quad (2)$$

$$D_F = \{s \times (H-f)\}/(H-s) \quad (3)$$

In the description given below, a diameter of the permissible circle of confusion that keeps an amount of focal blur within one pixel will be denoted as c, and the depth of field defined upon setting the focusing position at a distance S so as to recognize the face will be denoted as W0.

In the case where the focusing position S is on the nearer side of the hyperfocal distance H0 as shown in FIG. 11(*a*), the rear edge of the depth of field falls within a finite distance. Here, the focusing position control unit 103 calculates, taking the area of the face region into account, a depth of field W1 that enables a resolution sufficient for recognizing the face with the focusing position set at S to be secured. As an example, it will be assumed that the face to be recognized has an area twice as large as the area required for recognition in horizontal and vertical directions. In this case, enlarging the diameter of the permissible circle of confusion required for recognition up to 2c still enables the resolution required for recognition to be attained.

Accordingly, upon denoting as H1 the hyperfocal distance reset on the premise that the diameter of the permissible circle of confusion is now 2c, the focusing position control unit 103 utilizes the equation (1) to calculate H1=H0/2. Accordingly, the hyperfocal distance H1 moves to the nearer side of the hyperfocal distance H0. Specifically, in the case where the hyperfocal distance H1 is on the nearer side of the focusing position S as shown in FIG. 11(*b*), the rear edge of the depth of field W1 is extended to infinity. Also, the front edge of the depth of field W1 extends farther forward, in comparison with the depth of field W0. Thus, the larger the area of the face region is, the wider the depth of field W1 becomes.

Further, in the case where the hyperfocal distance H1 is on the nearer side of the face recognition distance S, the focusing position control unit 103 sets the focusing position at the hyperfocal distance H1 as shown in FIG. 11(*c*), thereby extending further the depth of field W2 which enables recognition of objects. The focusing position control unit 103 can thus extend the depth of field which enables recognition of objects, by properly controlling the focusing position on the basis of the area of the face region.

Accordingly, in the case where the face region has a sufficient area, the focusing position control unit 103 sets the focusing position beyond the face recognition distance at the step S303, thereby extending the depth of field which enables recognition of objects. Extending thus the depth of field in the case where the face region has a sufficient area enables a resolution required for the face recognition process to be secured, despite a sudden movement of the object.

In the case where the area of the face region is insufficient, the focusing position control unit 103 sets the focusing position close to the face recognition distance at the step S304, thereby improving the resolution of the face region.

Consequently, the imaging device for recognition 100A according to the second embodiment adjusts the focusing position on the basis of the area of the face region, thereby recognizing the face successively and stably from time to time.

Embodiment 3

An imaging device for recognition according to a third embodiment of the present invention changes an aperture value on the basis of the area and light amount of the face region. More specifically, the imaging device for recognition according to the third embodiment increases the aperture value in the case where the face region has a large area.

Through such a process, the imaging device for recognition according to the third embodiment can stably perform the face recognition.

In the following passages, differences from the first and the second embodiment will be primarily described, and the description already made will not be repeated. Also, the same constituents will be given the same numeral.

Figure 12:
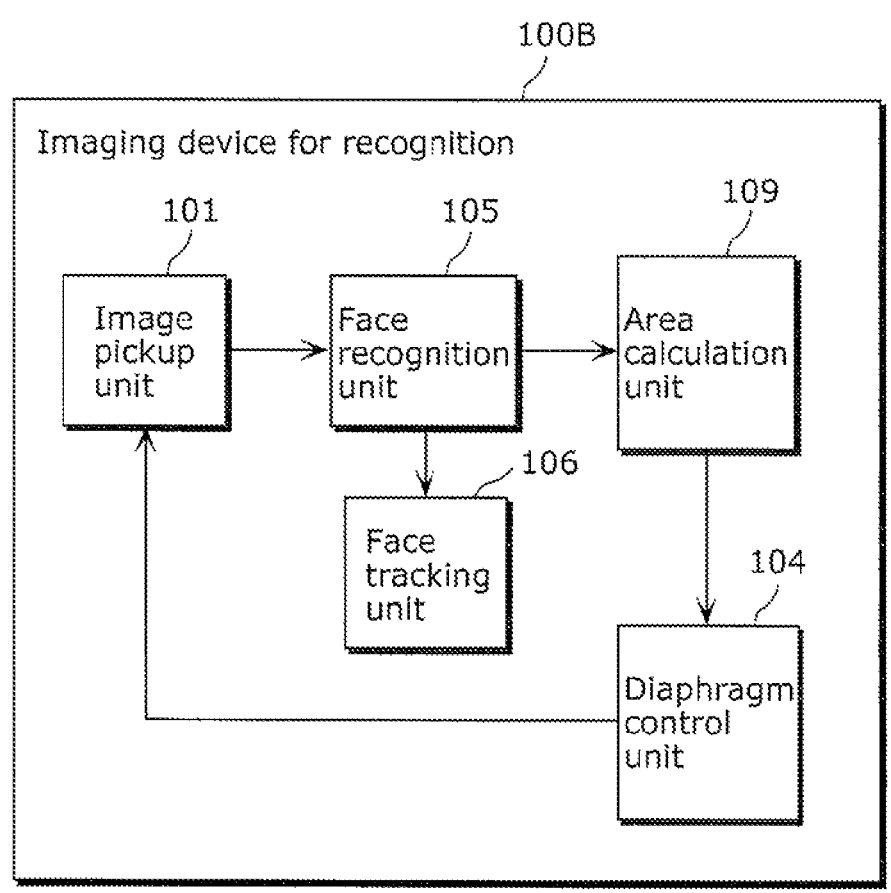
FIG. 12 is a block diagram of an imaging device for recognition according to a third embodiment of the present invention.

FIG. 12 is a block diagram of the imaging device for recognition 100B according to the third embodiment of the present invention.

The imaging device for recognition 100b shown in FIG. 12 is different from the imaging device for recognition 100 of the first embodiment in including a diaphragm control unit 104 in place of the exposure control unit 102.

Figure 13:
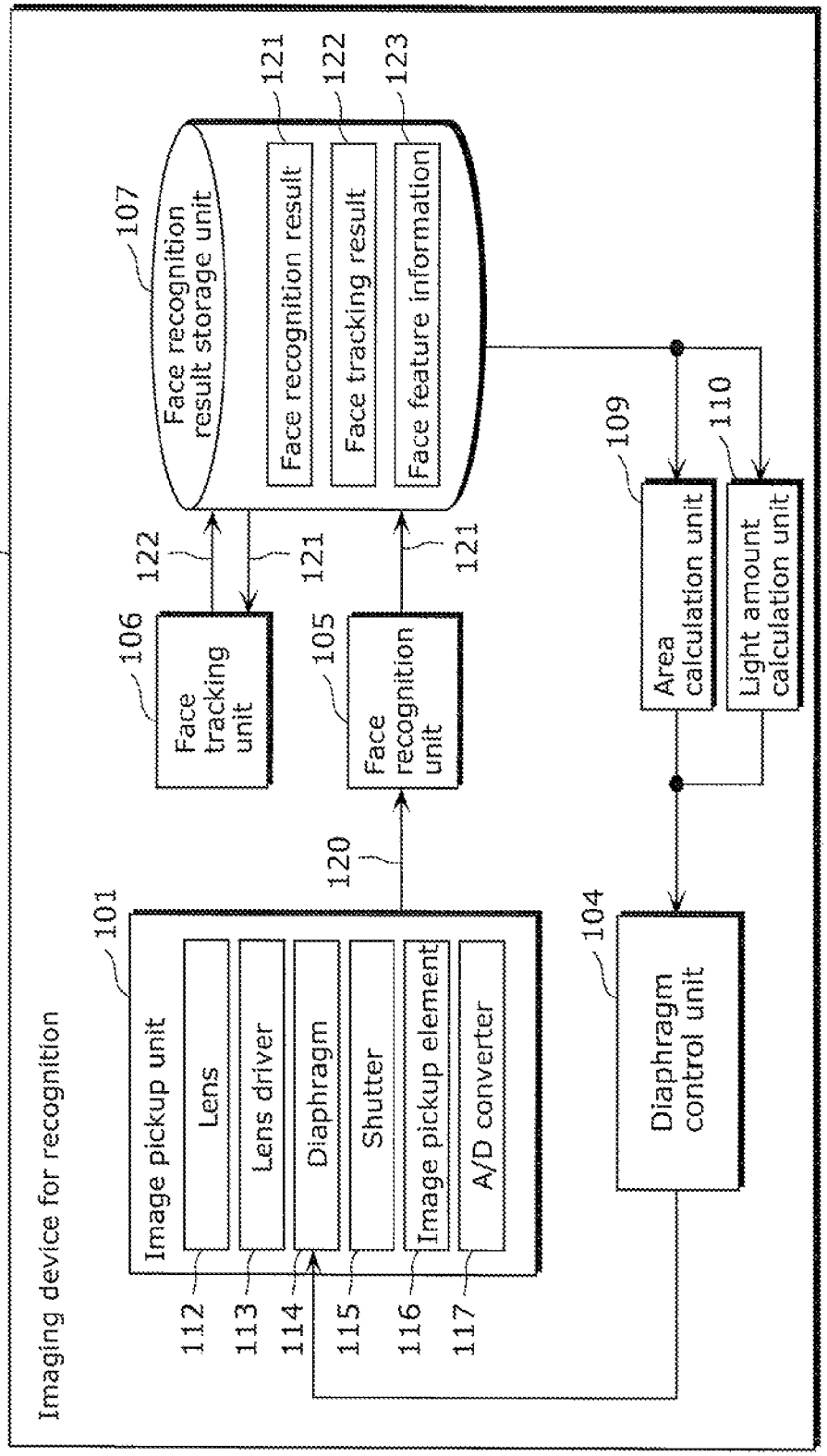
FIG. 13 is a detailed block diagram of the imaging device for recognition according to the third embodiment of the present invention.

FIG. 13 is a block diagram showing a detailed configuration of the imaging device for recognition 100B.

The diaphragm control unit 104 adjusts the aperture value at the diaphragm 114 of the image pickup unit 101. Reducing the aperture value increases the amount of light passing through the lens 112, thereby increasing the volume of electrical signals of a subject, resulting in an increase in light amount of the input image. However, the depth of field becomes shallower (in-focus range is narrowed). On the other hand, increasing the aperture value decreases the amount of light passing through the lens, thereby decreasing the volume of electrical signals of a subject, resulting in a decrease in light amount of the input image. However, the depth of field becomes deeper (in-focus range is extended).

Specifically, the diaphragm control unit 104 sets a first aperture value in the case where the area of the face region is smaller than the area threshold, and sets a second aperture value higher than the first aperture value in the case where the area of the face region is equal to or larger than the area threshold.

Description will now be given on a calculation method of the aperture value performed by the diaphragm control unit 104 on the basis of information generated by the area calculation unit 109 and the light amount calculation unit 110. It will be assumed here that the face to be processed is the face about which the camera is to be controlled.

Figure 14:
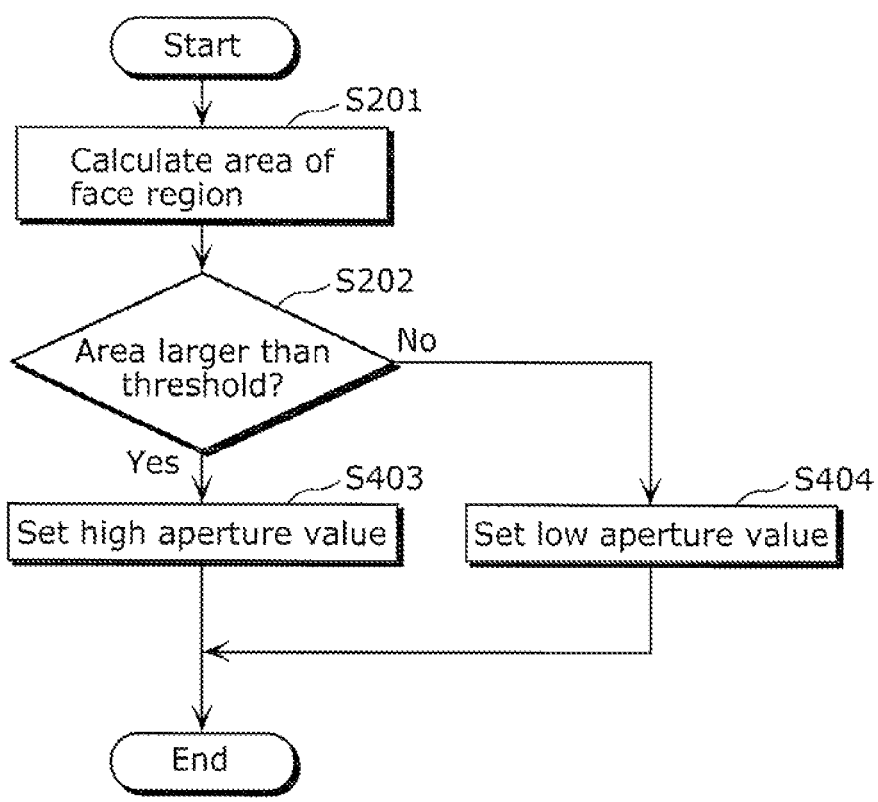
FIG. 14 is a flowchart showing a diaphragm control process based on an area of the face region, performed by the imaging device for recognition according to the third embodiment of the present invention.

First, a control process of the aperture value performed by the diaphragm control unit 104 on the basis of the area of the face region will be described. FIG. 14 is a flowchart showing the control process of the aperture value based on the area of the face region.

Figure 15:
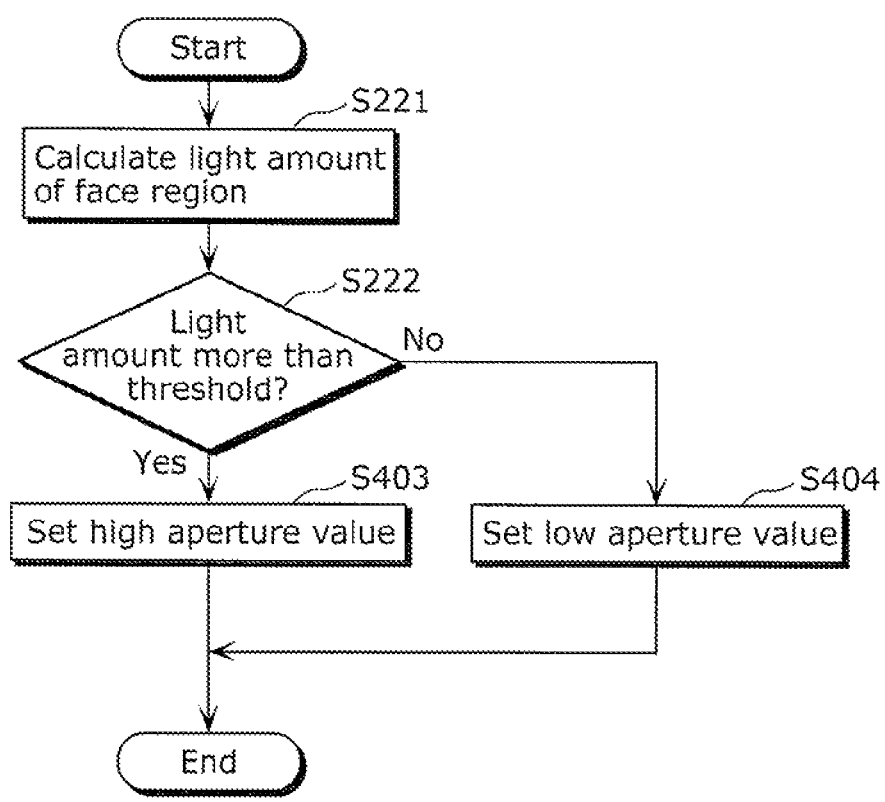
FIG. 15 is a flowchart showing a diaphragm control process based on a light amount on the face region, performed by the imaging device for recognition according to the third embodiment of the present invention.

The series of steps shown in FIGS. 14 and 15 are performed with respect to every frame. However, the series of steps shown in FIGS. 14 *and* 15 may be performed with respect to a predetermined plurality of frames.

As shown in FIG. 14, first the area calculation unit 109 calculates the area of the face region to be processed (S201). It will be assumed that the number of pixels of the face region in the input image is utilized as the area.

Then the diaphragm control unit 104 decides whether the area of the face region is equal to or larger than the area threshold (S202).

In the case where the area of the face region is equal to or larger than the area threshold (Yes at S202), the diaphragm control unit 104 sets a higher aperture value than a current aperture value (S403).

In this case, the recognition range is extended since the higher aperture value creates the wider depth of field.

In the case where the face region contains a large number of pixels, noises of the respective pixels are leveled off upon scaling down to the size of the image for recognition, and hence the impact of the noise is reduced. This leads to a relative increase in signal volume of the pixels in the face region, thereby enabling a light amount required for recognition to be secured, despite the increase in aperture value. Thus, the diaphragm control unit 104 can extend the recognition range while securing the light amount required for recognition. Also, extending the depth of field enables a resolution required for the object recognition process to be secured, despite a sudden movement of the object.

It is preferable that the diaphragm control unit 104 increases the aperture value to the extent that the light amount comes close to the light amount threshold. In other words, the diaphragm control unit 104 sets the higher aperture value, the larger the area is.

On the contrary, in the case where the area of the face region is smaller than the area threshold (No at S202), the diaphragm control unit 104 sets a lower aperture value than the current aperture value (S404). The diaphragm control unit 104 thus sets the lower aperture value, the smaller the area of the face region is.

In the case where the number of pixels in the face region of the input image is small, noises are suppressed from being leveled off in the process of scaling down to the size of the image for recognition, and hence the impact of the noise is increased. Nevertheless, the diaphragm control unit 104 can secure the light amount required for recognition by decreasing the aperture value.

Also, the diaphragm control unit 104 may be configured to set, at the step S404, an aperture value that is at least lower than an aperture value to be set at the step S403.

Although the foregoing process employs a single threshold to adjust the aperture value, a plurality of thresholds may be employed. For example, the diaphragm control unit 104 may increase the aperture value when the area of the face region is equal to or larger than a first area threshold; decrease the aperture value when the area of the face region is smaller than a second area threshold lower than the first area threshold; and keep the current aperture value when the area of the face region is between the first area threshold and the second area threshold. Also, the diaphragm control unit 104 may adjust the amount of change in aperture value in accordance with the relationship between the area of the face region and the plurality of area thresholds.

Now, a control process of the aperture value performed by the diaphragm control unit 104 on the basis of the light amount in the face region will be described. FIG. 15 is a flowchart showing the control process of the aperture value based on the light amount in the face region.

As shown in FIG. 15, first the light amount calculation unit 110 calculates the light amount in the face region to be processed (S221). It will be assumed that a mean value of luminosity of a plurality of pixels of the face region in the input image is utilized as the area.

Then the diaphragm control unit 104 decides whether the light amount in the face region is equal to or larger than the light amount threshold (S222).

In the case where the light amount in the face region is equal to or larger than the light amount threshold (Yes at S222), the diaphragm control unit 104 sets a higher aperture value than a current aperture value (S403).

In this case, the recognition range is extended since the higher aperture value creates the wider depth of field. Accordingly, it is preferable that the diaphragm control unit 104 increases the aperture value to the extent that the light amount comes close to the light amount threshold. In other words, the diaphragm control unit 104 sets the higher aperture value the larger the light amount is.

For example, in the case where a large amount of light is present in the face region of the input image, the volume of the signal of each pixel in the face region is increased in comparison with an amount of noise generated in the image pickup unit 101. Accordingly, a light amount required for recognition can be secured despite the increase in aperture value. Thus, the diaphragm control unit 104 can extend the recognition range while securing the light amount required for recognition. Also, extending the depth of field when the light amount is sufficient enables a resolution required for the object recognition process to be secured, despite a sudden movement of the object.

On the contrary, in the case where the light amount in the face region is smaller than the light amount threshold (No at S222), the diaphragm control unit 104 sets a lower aperture value than the current aperture value (S404). Since the lower aperture value results in the narrower recognition range, it is preferable to decrease the aperture value to the extent that the light amount comes close to the light amount threshold. Thus, the diaphragm control unit 104 sets the lower aperture value the smaller the light amount is.

For example, in the case where the light amount in the face region of the input image is small, the volume of the signal of each pixel in the face region is decreased in comparison with an amount of noise generated in the image pickup unit 101. Accordingly, the diaphragm control unit 104 can secure a light amount required for recognition by decreasing the aperture value.

Also, the diaphragm control unit 104 may be configured to set at the step S404 an aperture value that is at least lower than the aperture value to be set at the step S403.

Although the foregoing process employs a single threshold to adjust the aperture value, a plurality of thresholds may be employed. For example, the diaphragm control unit 104 may increase the aperture value when the light amount in the face region is equal to or larger than a first light amount threshold; decrease the aperture value when the light amount in the face region is smaller than a second light amount threshold lower than the first light amount threshold; and keep the current aperture value when the light amount in the face region is between the first light amount threshold and the second light amount threshold. Also, the diaphragm control unit 104 may adjust the amount of change in aperture value in accordance with the relationship between the light amount in the face region and the plurality of light amount thresholds.

As described above, the imaging device for recognition 1008 according to the third embodiment of the present invention controls the aperture value on the basis of the area and light amount of the face region, thereby maximizing the depth of field which enables recognition of objects, while securing the light amount required for recognition. Thus, the imaging device for recognition 100B can perform the recognition more stably.

Also, although the foregoing process separately employs each of the area and the light amount of the face region, these factors may be combined. In other words, the diaphragm control unit 104 may adjust the aperture value on the basis of at least one of the area and the light amount of the face region.

Further, at the step S403 and S404 shown in FIGS. 14 and 15, the diaphragm control unit 104 may adjust the amount of change in aperture value on the basis of at least one of the area and the light amount of the face region. The specific controlling method may be the same as the foregoing.

Although some embodiments of the imaging device for recognition according to the present invention have been described above, it is to be understood that the present invention is in no way limited to those embodiments.

For example, the foregoing embodiments refer to the case where the face is the object to be recognized, however the present invention is applicable to the case of recognizing any desired object in an image.

Although the exposure time, the focusing position, and the aperture value are individually controlled according to the first to the third embodiments, controlling those factors in combination is also included in the present invention. In other words, the imaging device for recognition according to the present invention may include two or more of the exposure control unit 102, the focusing position control unit 103, and the diaphragm control unit 104.

For example, in the process shown in FIG. 7, the focusing position or the aperture value may be adjusted, in the case where the shutter speed is kept unchanged (No at S231, and No at S232).

In this case, the area thresholds to be respectively employed for adjusting the exposure time, the focusing position, and the aperture value may be different from each other. Likewise, the speed thresholds to be respectively employed for adjusting the exposure time, the focusing position, and the aperture value may be different from each other.

The processing units provided in the imaging device for recognition according to the foregoing embodiments may be typically realized in a form of an LSI. The processing units may be separately implemented in a respective chip, or a part or whole of those units may be implemented in a single chip.

Alternatively, such circuit integration may be realized in an exclusive circuit or a general-purpose processor, other than the LSI. A field programmable gate array (FPGA) that can be programmed after manufacturing the LSI, or a reconfigurable processor that accepts rearrangement of circuit cells in the LSI may also be employed.

Also, a part or whole of the functions of the imaging device for recognition according to the embodiments of the present invention may be realized by causing a processor such as a CPU to execute the corresponding programs.

For example, the functional units except the image pickup unit 101 provided in the imaging device for recognition 100, 100A, and 100B may be realized by causing a processor such as a CPU to execute the corresponding programs.

The present invention may be the foregoing program, or a non-transitory computer-readable recording medium containing that program. Naturally, such a program can be distributed through a communication medium such as the internet.

Further, at least a part of the functions of the imaging device for recognition according to the first to the third embodiments and variations thereof may be combined.

The numeric values cited in the foregoing description are merely for specifically explaining the present invention, and in no way for limiting the present invention.

The sequence in which the foregoing steps are performed is merely for specifically explaining the present invention, and those steps may be performed in different sequences. Also, a part of those steps may be performed simultaneously (in parallel) with other steps.

For example, in the process shown in FIG. 7, the steps S201 and S221 may be performed in any desired sequence. Likewise, the steps S231 and S232 may also be performed in any desired sequence.

Further, it is to be understood that various modifications of the foregoing embodiments obvious to those skilled in the art are included in the scope of the present invention.

INDUSTRIAL APPLICABILITY

The present invention is applicable to an imaging device for recognition and a controlling method therefor. The present invention is also applicable to cameras including the imaging device for recognition, such as a digital still camera, a digital video camera, a network camera, or a security camera.

The invention claimed is:

1. An imaging device for recognition including an image pickup unit that sequentially generates a plurality of images by shooting an object, an object recognition unit that recognizes, in each of the plurality of images, an object region in which the object is located in the image, and a tracking unit that tracks the object region across the plurality of images, said imaging device for recognition comprising:
   an area calculation unit configured to calculate an area of the object region; and
   an exposure control unit configured to set a first exposure time for the image pickup unit in the case where the area is smaller than a first threshold, and to set a second exposure time longer than the first exposure time in the case where the area is equal to or larger than the first threshold,
   wherein said exposure control unit is configured to set the first exposure time in the case where a resolution for recognition proportional to the area and inversely proportional to a motion blur in the object region is lower than a second threshold, and to set the second exposure time in the case where the resolution for recognition is equal to or higher than the second threshold.

2. The imaging device for recognition according to claim 1, further comprising
   a moving speed calculation unit configured to calculate a moving speed of the object region;
   wherein said exposure control unit is further configured to set a third exposure time in the case where the moving speed is lower than a third threshold, and to set a fourth exposure time shorter than the third exposure time in the case where the moving speed is equal to or higher than the third threshold.

3. The imaging device for recognition according to claim 1, further comprising
   a light amount calculation unit configured to calculate a light amount in the object region,
   wherein said exposure control unit is configured to set a fifth exposure time for the image pickup unit in the case where a light amount for recognition proportional to the area and to the light amount is equal to or larger than a fourth threshold, and to set a sixth exposure time longer than the fifth exposure time in the case where the light amount for recognition is smaller than the fourth threshold.

4. A method of controlling an imaging device for recognition including an image pickup unit that sequentially generates a plurality of images by shooting an object, said method comprising:
   recognizing, in each of the plurality of images, an object region in which the object is located in the image;
   tracking the object region across the plurality of images;
   calculating an area of the object region; and
   controlling an exposure of the image pickup unit so as to set a first exposure time in the case where the area is smaller than a first threshold, to set a second exposure time longer than the first exposure time in the case where the area is equal to or larger than the first threshold, to set the first exposure time in the case where a resolution for recognition proportional to the area and inversely proportional to a motion blur in the object region is lower than a second threshold, and to set the second exposure time in the case where the resolution for recognition is equal to or higher than the second threshold.

5. A non-transitory computer-readable recording medium comprising a program configured to cause a computer to execute said method according to claim 4.

6. A semiconductor integrated circuit comprising the image pickup unit, the object recognition unit, said tracking unit, said area calculation unit, and said exposure control unit according to claim 1.

* * * * *